US010838663B2

(12) United States Patent
Sato et al.

(10) Patent No.: US 10,838,663 B2
(45) Date of Patent: Nov. 17, 2020

(54) MEMORY DEVICE INCLUDING NON-VOLATILE MEMORY AND METHOD OF MANAGING DATA THEREOF

(71) Applicant: TOSHIBA MEMORY CORPORATION, Tokyo (JP)

(72) Inventors: Keisuke Sato, Yokohama Kanagawa (JP); Shuichi Sakurai, Yokohama Kanagawa (JP); Masahiko Nakashima, Kawasaki Kanagawa (JP); Kuniaki Ito, Funabashi Chiba (JP); Hitomi Tanaka, Ota Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 300 days.

(21) Appl. No.: 15/907,275

(22) Filed: Feb. 27, 2018

(65) Prior Publication Data
US 2019/0065122 A1  Feb. 28, 2019

(30) Foreign Application Priority Data
Aug. 29, 2017  (JP) .................. 2017-164452

(51) Int. Cl.
| | |
|---|---|
| G06F 3/06 | (2006.01) |
| A63F 13/213 | (2014.01) |
| A63F 13/235 | (2014.01) |
| A63F 13/31 | (2014.01) |
| A63F 13/323 | (2014.01) |
| H04B 5/00 | (2006.01) |
| A63F 13/32 | (2014.01) |

(Continued)

(52) U.S. Cl.
CPC ......... *G06F 3/0661* (2013.01); *A63F 13/213* (2014.09); *A63F 13/235* (2014.09); *A63F 13/31* (2014.09); *A63F 13/32* (2014.09); *A63F 13/323* (2014.09); *A63F 13/327* (2014.09); *A63F 13/46* (2014.09); *A63F 13/95* (2014.09); *G06F 3/0604* (2013.01); *G06F 3/0659* (2013.01); *G06F 3/0679* (2013.01); *H04B 5/0037* (2013.01); *H04B 5/0075* (2013.01)

(58) Field of Classification Search
None
See application file for complete search history.

(56) References Cited

U.S. PATENT DOCUMENTS

| | | |
|---|---|---|
| 7,250,867 B2 | 7/2007 | Sakama et al. |
| 7,482,934 B2 | 1/2009 | Nakamura et al. |
| | (Continued) | |

FOREIGN PATENT DOCUMENTS

| | | |
|---|---|---|
| JP | 2005210676 A | 8/2005 |
| JP | 2009086844 A | 4/2009 |
| | (Continued) | |

*Primary Examiner* — James S. McClellan
*Assistant Examiner* — Peter J Iannuzzi
(74) *Attorney, Agent, or Firm* — Kim & Stewart LLP

(57) ABSTRACT

A memory device includes a non-volatile memory and a controller. The controller is configured to control the non-volatile memory and includes a receiving circuit configured to receive first data from an external device, a converting circuit configured to convert the first data received by the receiving circuit to second data having a data size equal to or smaller than a data size of the first data, and a writing circuit configured to write the second data converted by the converting circuit in the non-volatile memory.

18 Claims, 8 Drawing Sheets

(51) Int. Cl.
    *A63F 13/46*     (2014.01)
    *A63F 13/327*    (2014.01)
    *A63F 13/95*     (2014.01)

(56) References Cited

U.S. PATENT DOCUMENTS

| | | | |
|---|---|---|---|
| 9,269,038 B2 | | 2/2016 | Ikemoto et al. |
| 9,460,118 B2 * | | 10/2016 | Feder ..................... G06F 16/51 |
| 9,501,399 B2 | | 11/2016 | Wakutsu et al. |
| 9,583,141 B2 * | | 2/2017 | Cohen ................. G11B 27/034 |
| 2005/0273470 A1 * | | 12/2005 | Heigold ............... H04N 1/3871 |
| 2007/0094588 A1 * | | 4/2007 | Klassen ............. G06F 16/9577 |
| | | | 715/210 |
| 2007/0145152 A1 | | 6/2007 | Jogand-Coulomb et al. |
| 2007/0252706 A1 | | 11/2007 | Furutani |
| 2014/0098985 A1 * | | 4/2014 | Brubeck .......... H04N 21/23892 |
| | | | 382/100 |
| 2014/0226293 A1 | | 8/2014 | Sato |
| 2016/0092472 A1 * | | 3/2016 | Feder ..................... G06F 16/51 |
| | | | 382/306 |
| 2017/0269865 A1 * | | 9/2017 | Willcock ............. G06F 3/0604 |
| 2018/0270388 A1 * | | 9/2018 | Gharaibeh ........... H04N 19/423 |

FOREIGN PATENT DOCUMENTS

| | | | |
|---|---|---|---|
| JP | 2009522662 A | 6/2009 |
| JP | 1667397 B2 | 4/2011 |
| JP | 5372049 B2 | 12/2013 |
| JP | 2014154777 A | 8/2014 |
| JP | 5835360 B2 | 12/2015 |
| WO | 2006075359 A1 | 7/2006 |

* cited by examiner

MEMORY DEVICE INCLUDING NON-VOLATILE MEMORY AND METHOD OF MANAGING DATA THEREOF

CROSS-REFERENCE TO RELATED APPLICATION

This application is based upon and claims the benefit of priority from Japanese Patent Application No. 2017-164452, filed Aug. 29, 2017, the entire contents of which are incorporated herein by reference.

FIELD

Embodiments described herein relate generally to a memory device including a non-volatile memory and a method of managing data thereof.

BACKGROUND

A memory device, which is attachable to and detachable from a host device and includes a non-volatile memory, has been widely used. When the memory device is mounted in the host device, the host device can write data into the memory device and read data from the memory device. The memory device attachable to and detachable from the host device includes various auxiliary memory devices such as, for example, a memory card.

DETAILED DESCRIPTION

Figure 1:
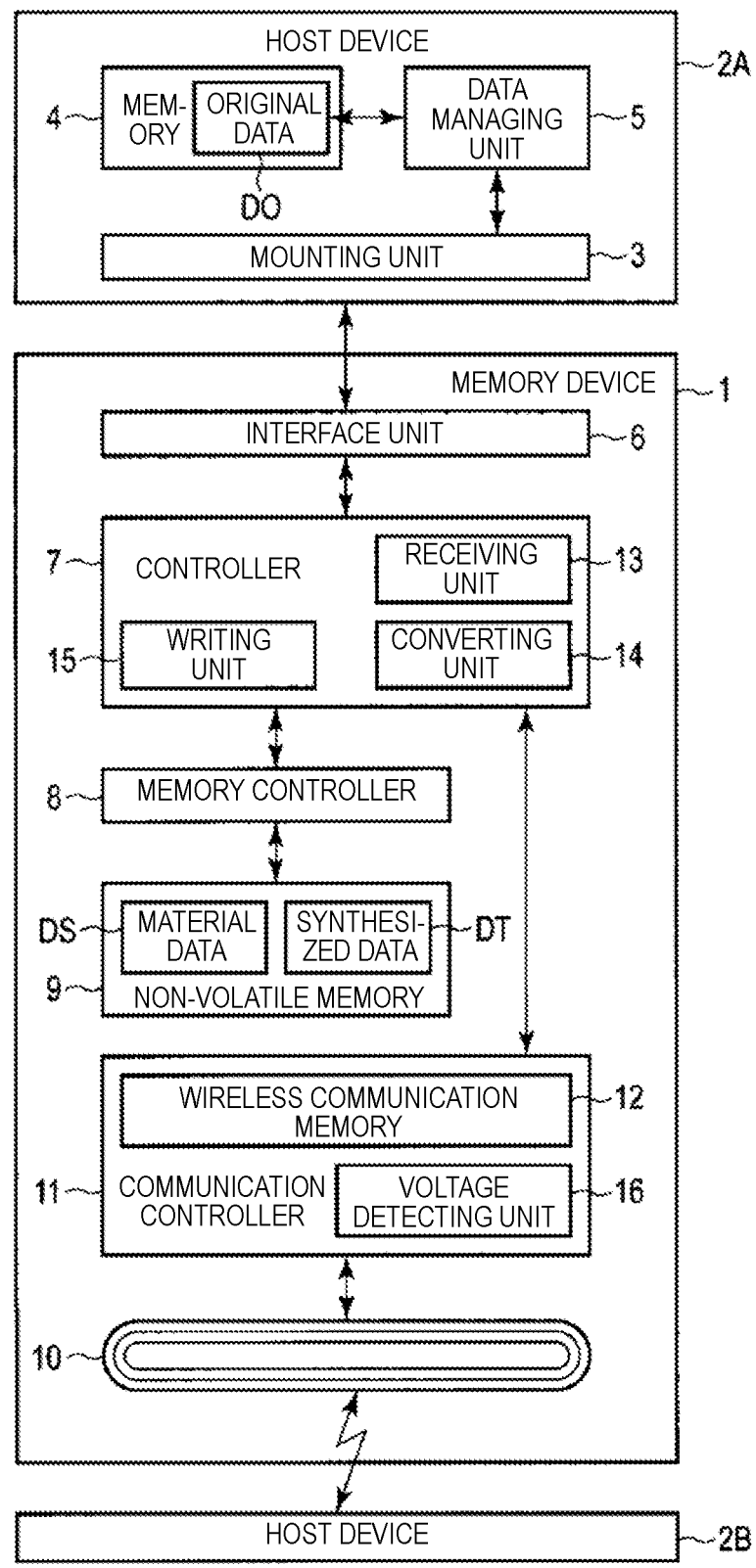
FIG. 1 is a block diagram illustrating an example of a configuration of a memory device according to a first embodiment.

Embodiments provide a memory device which performs conversion of original data, of which a storage position in an external device is managed, and writes the converted data in a non-volatile memory of the memory device.

In general, according to one embodiment, a memory device includes a non-volatile memory and a controller. The controller controls the non-volatile memory and includes a receiving circuit configured to receive first data from an external device, a converting circuit configured to convert the first data received by the receiving circuit to second data having a data size equal to or smaller than a data size of the first data, and a writing circuit configured to write the second data converted by the converting circuit in the non-volatile memory.

Hereinafter, each embodiment will be described with reference to the drawings. In the description below, substantially the same functions and elements are denoted with the same reference numeral, and are described as necessary.

First Embodiment

In the present embodiment, a memory device which is attachable to and detachable from a host device, performs a data conversion on original data received from the host device, and writes the data converted by the data conversion in a non-volatile memory, will be described.

The present embodiment will be described based on the case where data is image data and the data conversion is a synthesis of the image data as an example. However, the data may be different kinds of data, for example, sound data or text data, instead of image data, and the data conversion may be other processing instead of a conversion or a synthesis of image data.

FIG. 1 is a block diagram illustrating an example of a configuration of a memory device 1 according to the present embodiment.

The memory device 1 is attachable to and detachable from a host device 2A.

The host device 2A is an electronic device such as, for example, a toy, a smart watch, a gaming device, a mobile phone (including a smart phone), an information processing device, a computer, a wearable terminal, a digital camera, and a control device. In the present embodiment, the host device 2A has an image capturing function. The host device 2A includes a mounting unit 3, a memory 4, and a data managing unit 5.

The mounting unit 3 enables the memory device 1 to be attachable and detachable to the host device 2A, and is, for example, a connector or a memory card slot.

The memory 4 stores, for example, original data DO. The original data DO is, for example, image data captured by the host device 2A.

The data managing unit 5 is, for example, a file system driver, and manages a storage position, and writing and reading of data for the memory 4 and the memory device 1. The data managing unit 5 is implemented by executing, for example, software by a processor.

The memory device 1 may be various memory devices such as, for example, a memory card (secure digital (SD) memory card or a multimedia card), a universal serial bus (USB) memory, a hard disk drive (HDD), or a solid state disk (SSD). The present embodiment will be described based on the case where the memory device 1 is a memory card as an example.

For example, the memory device 1 can wirelessly communicate with a host device 2B, and for example, the memory device 1 may communicate a command, an address, data, information, an instruction, a signal, and the like with the host device 2B.

The host device 2B has a wireless communication function, and may be, for example, a mobile phone, a computer, a gaming device, a wearable terminal, a portable device, and a control device.

In the present embodiment, when a user brings the memory device 1 to be in contact with, or to be in close contact with the host device 2B, wireless communication is established between the memory device 1 and the host device 2B.

In the present embodiment, the memory device 1 performs the wireless communication under, for example, near field communication (NFC) according to a near field wireless communication standard, at a frequency of 13.56 MHz and the like. However, the wireless communication carried out by the memory device 1 may be according to various wireless communication such as, for example, a wireless local area network (LAN). The NFC can communicate with lower electric power than that of a general wireless LAN.

When the host device 2A is mounted with the memory device 1, the memory device 1 is electrically connected with the host device 2A to receive electric power from the host device 2A. The memory device 1 can transmit data to the host device 2A, and can receive data from the host device 2A. Further, the memory device 1 has a function of communicating data with an external device, such as the host device 2B, by electric power generated by electromagnetic induction of a wireless antenna 10 even when the memory device 1 does not receive electric power from the host device 2A. That is, the memory device 1 can transmit data to the host device 2B and receive data from the host device 2B through, for example, wireless communication. The memory device 1 can operate a portion of its components based on electric power generated by electromagnetic induction based on radio waves from the host device 2B even when the memory device 1 does not receive electric power from the host device 2A.

In the present embodiment, the memory device 1 communicates data with the host device 2A according to a wired interface such as, for example, an SD interface, but may use other interfaces. Further, the memory device 1 may communicate the data with the host device 2B by using, for example, an NFC interface, but may use other wireless communication interfaces.

The memory device 1 includes an interface unit 6, a controller 7, a memory controller 8, a non-volatile memory 9, the wireless antenna 10, and a communication controller 11.

The interface unit 6 may provide the foregoing wired interface with, for example, a standardized connection terminal to electrically connect the memory device 1 and the host device 2A.

For example, the controller 7 receives a command, an address, data, information, an instruction, a signal, and the like from the host device 2A via the interface unit 6, from the non-volatile memory 9 via the memory controller 8, or from the host device 2B via the wireless antenna 10 and the communication controller 11. The controller 7 may serve as, for example, a bridge controller which controls communication of data between the memory controller 8 and the communication controller 11.

The controller 7 outputs a command, an address, data, information, an instruction, a signal, and the like to the host device 2A via the memory controller 8, the communication controller 11, or the interface unit 6 based on the received command.

The controller 7 may perform mirroring of data included in a predetermined region of the non-volatile memory 9 and data included in a predetermined region of the wireless communication memory 12. As used herein, the mirroring refers to making contents of the data to be identical, i.e., synchronized, between two or more memory. For example, the controller 7 may perform the mirroring when the memory device 1 receives electric power from the host device 2A, and may perform the mirroring when data of at least one of the non-volatile memory 9 and the wireless communication memory 12 is written or updated.

The controller 7 is for example a circuit that includes a receiving unit 13, a converting unit 14, and a writing unit 15.

The receiving unit 13 receives the original data DO, of which a storage position is managed by the data managing unit 5 of the host device 2A, from the host device 2A via the interface unit 6. The original data DO is, for example, image data before synthesis.

The converting unit 14 converts the original data DO received by the receiving unit 13 into synthetized data DT having a data size equal to or smaller than a data size of the original data DO. More specifically, when the original data DO is received by the receiving unit 13, the converting unit 14 reads material data DS stored in the non-volatile memory 9 via the memory controller 8, and generates synthesized data DT based on the original data DO and the material data DS. Further, the converting unit 14 determines whether a data size of the generated synthesized data DT is equal to or smaller than a data size of the original data DO. When the data size of the generated synthesized data DT is not equal to or smaller than the data size of the original data DO, the converting unit 14 converts the synthesized data DT so that the data size of the synthesized data DT is equal to or smaller than the data size of the original data DO.

The material data DS is, for example, image data related to an item (e.g., toy item) and a character (e.g., toy character).

The synthesized data DT may be, for example, a bitmap picture having transmission information.

Figure 3:
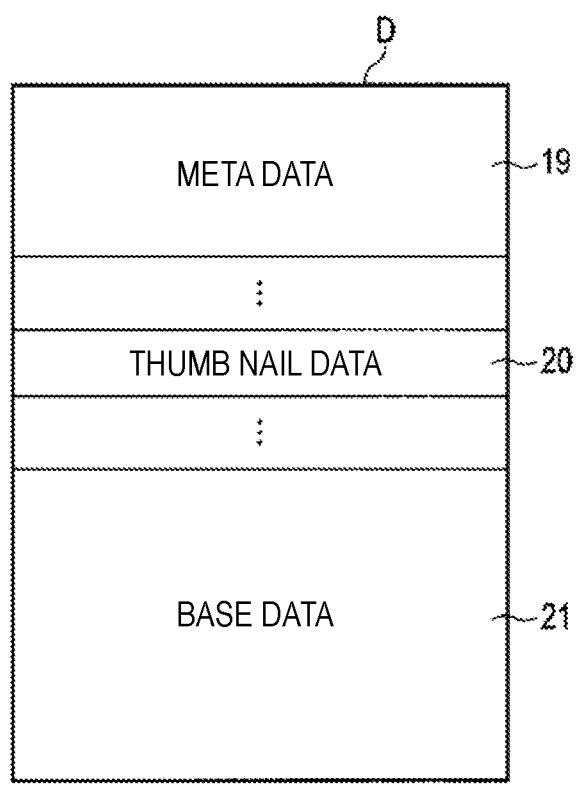
FIG. 3 is a data structure diagram illustrating an example of data written in the memory device according to the first embodiment.

Herein, the conversion processing by the converting unit 14 will be described by using a particular example. In the example, it is assumed that the original data DO includes meta data (e.g., a file header), thumb-nail data, and base data as illustrated in FIG. 3 (to be described below). For example, the converting unit 14 synthesizes the base data and the material data DS to generate thumb-nail data corresponding to the base data after the synthesis, and updates the original data DO by using the base data and the thumb-nail data after the synthesis to generate synthesized data DT. In this case, the converting unit 14 updates length information of an application data segment including the thumb-nail data within meta data of the synthesized data DT, changes length information of the thumb-nail data within the meta data, and updates information on a storage start position of the base data within the meta data.

In the present embodiment, even when the converting unit 14 generates the synthesized data DT which the host device 2A does not recognize, the converting unit 14 converts the synthesized data DT so that a data size of the synthesized data DT is equal to or smaller than a data size of the original data DO, thereby preventing the host device 2A from failing to recognize the synthesized data.

The converting unit 14 may make the data size of the synthetized data DT to be equal to or smaller than the data size of the original data DO, for example, by decreasing resolution of the synthesized data DT to be less than that of the original data DO.

For example, when meta data exists in the synthesized data DT that is an image file, the converting unit 14 may make a data size of the synthesized data DT to be equal to or smaller than a data size of the original data DO by removing vendor data in the meta data.

For example, when the synthesized data DT includes image data and the image data is compressed by using a compression algorithm, the converting unit 14 may make a data size of the synthesized data DT to be equal to or smaller than a data size of the original data DO by changing a compression level of the image data. When the data size of the synthesized data DT is larger than the data size of the original data DO and thus it is necessary to change a compression level of the image data in the synthetized data DT, the converting unit 14 may compress the image data again by increasing a compression ratio of the image data in the synthetized data DT. Further, the converting unit 14 may perform the synthesis again based on the original data DO and the material data DS by the setting, in which the compression level is increased, thereby preventing an image quality from being degraded due to the re-development and the re-compression and changing the data size of the synthesized data DT.

The converting unit 14 may make the data size of the synthesized data DT to be equal to or smaller than the data size of the original data DO by performing the above-described conversion processing. Accordingly, the data managing unit 5 of the host device 2A can recognize the synthesized data DT stored in the memory device 1, and the host device 2A may read the synthesized data DT from the memory device 1 and display the read synthesized data DT.

The writing unit 15 writes the synthesized data DT, which has the data size equal to or smaller than the data size of the original data DO and is synthetized by the converting unit 14, in the non-volatile memory 9 via the memory controller 8.

The writing unit 15 writes, for example, thumb nail data included in the synthesized data DT and other additional information (e.g., an item, a score, and the like obtained from characteristic information of the base data or the thumb nail data) included in the synthesized data DT in the wireless communication memory 12 directly or via the communication controller 11.

The memory controller 8 controls the non-volatile memory 9. The memory controller 8 writes data in the non-volatile memory 9 based on, for example, a command input from the controller 7. Further, the memory controller 8 reads data from the non-volatile memory 9 and outputs the data to the controller 7 based on, for example, a command input from the controller 7.

The non-volatile memory 9 may be, for example, a non-volatile semiconductor memory. The non-volatile memory 9 may be, for example, a NAND-type flash memory, but may be other non-volatile semiconductor memories, such as a NOR-type flash memory, a magnetoresistive random access memory (MRAM), a phase change random access memory (PRAM), a resistive random access memory (ReRAM), and a ferroelectric random access memory (FeRAM). The non-volatile memory 9 may be, for example, other non-volatile memory and magnetic memory. The non-volatile memory 9 may be, for example, a three-dimensional semiconductor memory.

The wireless antenna 10 is, for example, a printed circuit board (PCB) pattern antenna. A frequency band, in which the wireless antenna 10 is operable may be a predetermined frequency band corresponding to the NFC.

The wireless antenna 10 may generate electric power by electromagnetic induction based on, for example, radio waves from the host device 2B. The wireless antenna 10 supplies the generated electric power to the communication controller 11.

The wireless antenna 10 receives a command, an address, data, information, an instruction, a signal, and the like from the host device 2B. The wireless antenna 10 outputs the received command and the like to the communication controller 11.

The communication controller 11 includes a wireless communication memory 12 and a voltage detecting unit 16.

Alternatively, the communication controller 11 may be separated from the wireless communication memory 12.

The communication controller 11 performs the communication with the host device 2B and the like via the wireless antenna 10. The communication controller 11 receives a command, an address, data, information, an instruction, a signal, and the like from the controller 7 or the wireless antenna 10. The communication controller 11 outputs data to, for example, the controller 7 or the wireless antenna 10 based on the received command and the like. Further, the communication controller 11 reads data from the wireless communication memory 12 based on the received command, address, and the like, and outputs the read data to the controller 7 or the wireless antenna 10. Further, the communication controller 11 writes data in the wireless communication memory 12 based on the received command, address, data, and the like.

When the command and the data are received from the controller 7 or the wireless antenna 10, the communication controller 11 writes the data in the wireless communication memory 12. The communication controller 11 does not need to write the data in the wireless communication memory 12.

The communication controller 11 wirelessly communicates, for example, the thumb nail data and the additional information stored in the wireless communication memory 12 with the host device 2B via the wireless antenna 10.

The formats of the command, the address, the data, the information, the instruction, the signal, and the like communicated among the host device 2A, the interface unit 6, the controller 7, the memory controller 8, the communication controller 11, the wireless antenna 10, and the like may or may not be the same. That is, it is sufficient that the command, the address, the data, the information, the instruction, the signal, and the like can be recognized, at least, by the communicating parties.

The wireless communication memory 12 is, for example, a non-volatile memory. The wireless communication memory 12 stores data under the control of the communication controller 11, but may also store data under the control of the controller or the memory controller 8. Further, the wireless communication memory 12 may be volatile, and the storage of the data in the wireless communication memory 12 may be temporal. In the embodiment, an electrically erasable programmable read-only memory (EE-PROM) is used as the wireless communication memory 12, and the wireless communication memory 12 may use various memories, like the non-volatile memory 9.

In order for the wireless communication memory 12 to be operable with the electric power supplied from the wireless antenna 10, power consumption per unit capacity of a non-volatile memory used in the wireless communication memory 12 may be lower than that of the non-volatile memory 9. Particularly, a NOR-type memory may also be used as the wireless communication memory 12.

The voltage detecting unit 16 is electrically connected with the wireless antenna 10. The voltage detecting unit 16 detects a voltage supplied from the wireless antenna 10 to the communication controller 11. Further, the voltage detecting unit 16 issues a reset command to disable communication by the NFC until the communication controller 11 reaches a predetermined operable voltage. The communication controller 11 does not communicate by the NFC while receiving the reset command. An abnormal activation/operation of the communication by the NFC may be prevented by the reset command. When the voltage detecting unit 16 reaches a predetermined voltage, the voltage detecting unit 16 may output an operable command to the communication controller 11. Only when the communication controller 11 receives the operable command, the communication controller 11 performs the communication by the NFC.

The controller 7, the memory controller 8, and the communication controller 11 may be freely combined with or separated from one another. For example, the memory controller 8 may be provided in the controller 7. The memory controller 8 and the controller 7 may be integrated into one chip.

The controller 7, the memory controller 8, and the non-volatile memory 9 are operated when the memory device 1 receives electric power from the host device 2A. When the memory device 1 receives electric power only through the wireless antenna 10 and does not receive electric power from the host device 2A, the controller 7, the memory controller 8, and the non-volatile memory 9 are not operated. On the other hand, when the memory device 1 receives electric power through the wireless antenna 10 and does not receive electric power from the host device 2A, the communication controller 11 is operable. That is, when the wireless antenna 10 receives radio waves at a predetermined frequency corresponding to the NFC, the communication controller 11 is operated and the memory device 1 can communicate by the NFC.

The wireless communication controller 11 and the wireless antenna 10 may be omitted in the memory device 1. Further, the constituent elements serving as the wireless communication controller 11 and the wireless antenna 10 may be provided in the host device 2A.

Figure 2:
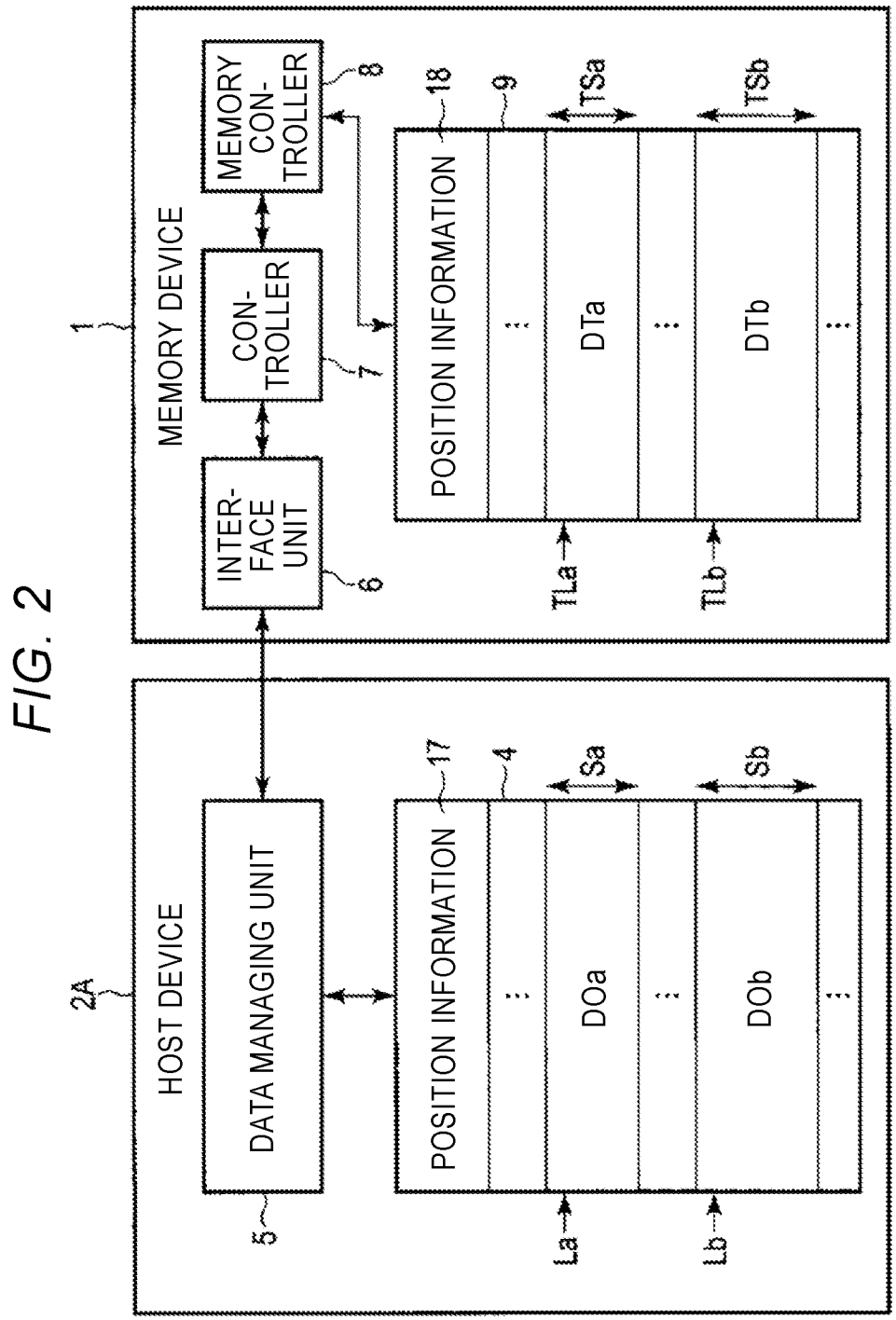
FIG. 2 is a block diagram illustrating an example of a data management state in the memory device and a host device in the first embodiment.

FIG. 2 is a block diagram illustrating an example of a data management state in the memory device 1 and the host device 2A in the present embodiment.

The data managing unit 5 is, for example, a file system driver as described above, and manages storage positions of the data (e.g., the file) stored in the memory 4 of the host device 2A and data stored in the memory device 1.

The data managing unit 5 of the host device 2A writes captured original data DOa and original data DOb in the memory 4, and manages storage positions (head positions La and Lb and data sizes Sa and Sb) of the original data DOa and the original data DOb by using position information 17 stored in the memory 4.

When the data managing unit 5 writes the original data DOa and the original data DOb in the memory device 1, the data managing unit 5 transmits the original data DOa and a write command of the original data DOa, and the original data DOb and a write command of the original data DOb to the controller 7 via the interface unit 6.

The controller 7 generates synthesized data DTa corresponding to the original data DOa according to the reception of the original data DOa and the write command of the original data DOa, writes the synthesized data DTa in the non-volatile memory 9 via the memory controller 8, and updates position information 18 so as to include a storage position (a head position TLa and a data size TSa) of the synthesized data DTa. Similarly, the controller 7 generates synthesized data DTb corresponding to the original data DOb according to the reception of the original data DOb and the write command of the original data Dab, writes the synthesized data DTb in the non-volatile memory 9 via the memory controller 8, and updates the position information 18 so as to include a storage position (a head position TLb and a data size TSb) of the synthesized data DTb.

Although not illustrated in FIG. 2, when the controller 7 generates the synthetized data DTa and DTB, the controller 7 reads the material data DS and a parameter stored in the non-volatile memory 9 via the memory controller 8 and uses the read material data DS and parameter in the processing of the synthesis.

When the data sizes TSa and TSb of the synthesized data DTa and DTb which are stored in the non-volatile memory 9 of the memory device 1 and correspond to the original data DOa and DOb are larger than the data sizes Sa and Sb of the original data DOa and DOb stored in the memory 4 of the host device 2A, there is the case where the data managing unit 5 determines that the file system is mismatched, so that the data managing unit 5 may not be normally operated.

Accordingly, in the present embodiment, the controller 7 generates the synthesized data DTa and DTb so that the data sizes TSa and TSb of the synthesized data DTa and DTb corresponding to the original data DOa and DOb are equal to or smaller than the data sizes Sa and Sb of the original data DOa and DOb stored in the memory 4 of the host device 2A.

FIG. 3 is a data structure diagram illustrating an example of data D written in the memory device 1 according to the present embodiment. The original data DO, DOa, and DOb and the synthesized data DT, DTa, and DTb may have the same data structure as that of data D of FIG. 3.

The data D is, for example, image data, and includes meta data 19, thumb nail data 20, and base data 21.

The meta data 19 is file information including, for example, a capturing date, a data size, and position information, and is, for example, a file header. The meta data may include, for example, exchangeable image file format (Exif) information.

The thumb nail data 20 is data used to generate a sample image of the base data 21.

The base data 21 is captured image data or compressed data of the image data.

In the present embodiment, for example, the controller 7 generates the synthesized data DT so as to have a data size that is equal to or smaller than the data size of the original data DO by adjusting a compression ratio of at least one of the thumb nail data 20 and the base data 21.

Figure 4:
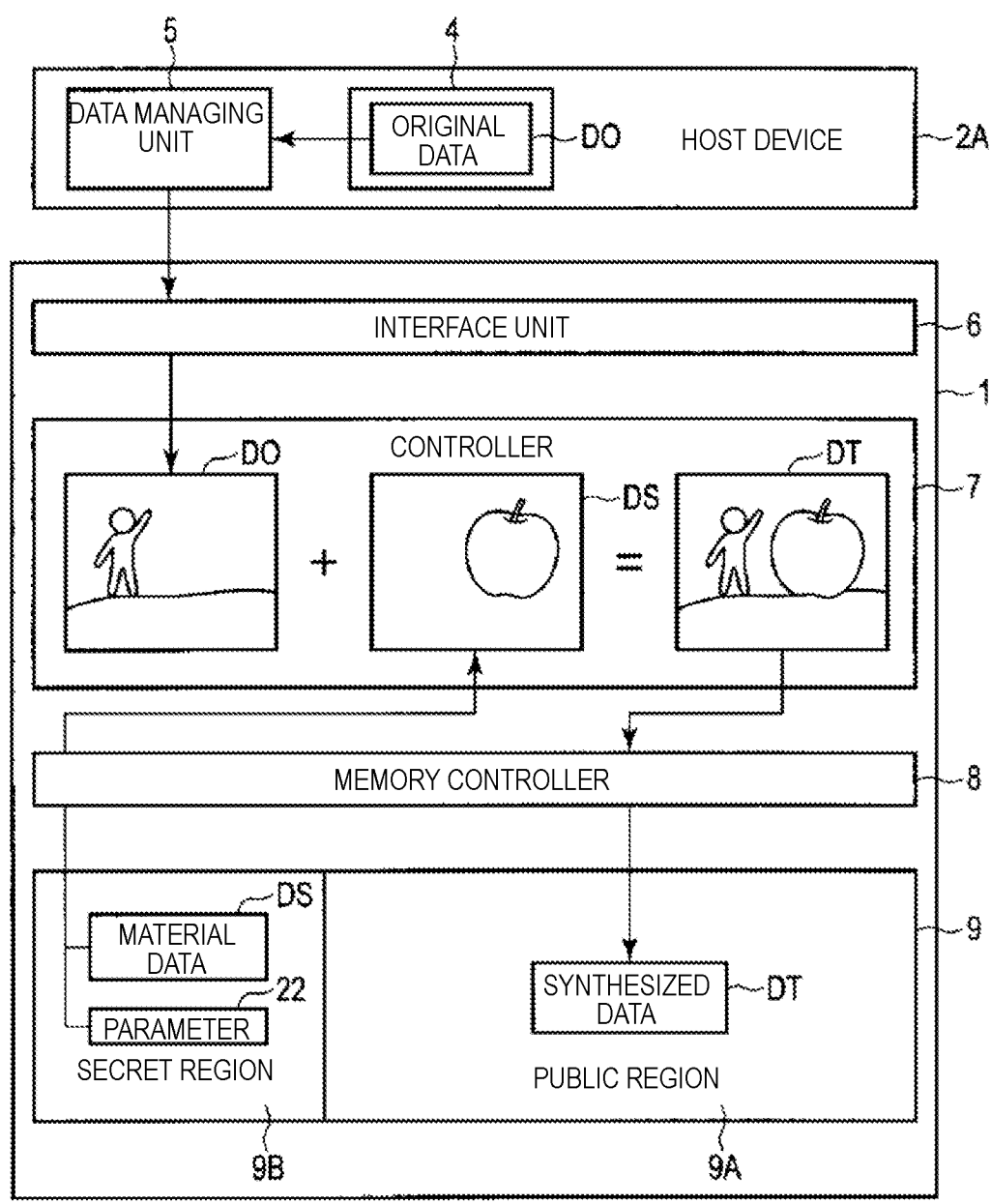
FIG. 4 is a block diagram illustrating an example of data conversion performed in the memory device according to the first embodiment.

FIG. 4 is a block diagram illustrating an example of data conversion performed in the memory device 1 according to the present embodiment, and represents synthesis processing as an example of the data conversion.

In the present embodiment, the host device 2A can read data from a public region 9A via the memory controller 8, the controller 7, and the interface unit 6. However, it is assumed that the host device 2A cannot read data from a secret region 9B via the memory controller 8, the controller 7, and the interface unit 6.

Further, it is assumed that the host device 2B cannot read data from the secret region 9B via the memory controller 8, the controller 7, the communication controller 11, and the wireless antenna 10 by using wireless communication.

The controller 7 can access both the public region 9A and the secret region 9B.

The material data DS and the parameter 22 stored in the secret region 9B can be re-written and updated. The update can be performed by the host device 2A via the interface unit 6, the controller 7, and the memory controller 8. When the host device 2A updates the material data DS and the parameter 22 of the secret region 9B, the update can be authenticated by a password and when the authentication is successful, the update may be permitted. For example, the plurality of pieces of the material data DS and the plurality of parameters 22 are stored in the secret region 9B, and the controller 7 selects appropriate data used for the conversion of the original data DO from the plurality of pieces of the material data DS and the plurality of parameters 22.

The material data DS and the parameter 22 stored in the secret region 9B may be re-written and updated by the host device 2B via the wireless antenna 10, the communication controller 11, the controller 7, and the memory controller 8. The update may be permitted when an authentication is successful by an authentication function of wireless communication from the host device 2B.

In the present embodiment, the material data DS and the parameter 22 required for the synthesis are stored in the secret region 9B.

The data managing unit 5 of the host device 2A transmits the original data DO and the write command stored in the memory 4 to the memory device 1.

The controller 7 of the memory device 1 receives the original data DO and the write command from the host device 2A via the interface unit 6. Then, the controller 7 determines the material data DS and the parameter 22 used for the synthesis based on a capturing date and time and position information of the meta data 19 included in the original data DO and brightness, chroma, tone, and the like of the thumb nail data 20 and the base data 21 included in the original data DO, and reads the determined material data DS and parameter 22 from the secret region 9B via the memory controller 8. Further, the controller 7 generates the synthesized data DT based on the original data DO and the determined material data DS and parameter 22. In the synthesis, the controller 7 generates the synthesized data DT so that a data size of the synthesized data DT is equal to or smaller than the data size of the original data DO. The controller 7 writes the synthesized data DT in the public region 9A via the memory controller 8.

Figure 5:
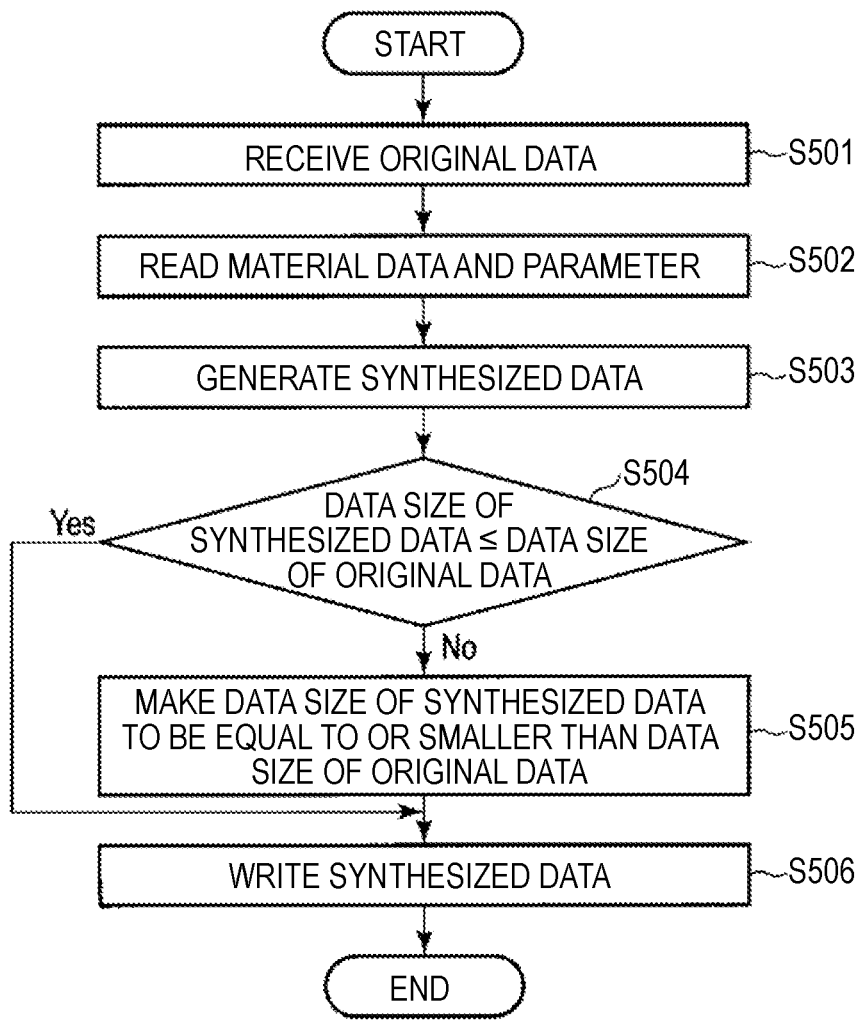
FIG. 5 is a flowchart illustrating an example of processing executed by a controller of the memory device according to the first embodiment.

FIG. 5 is a flowchart illustrating an example of processing executed by the controller 7 of the memory device 1 according to the present embodiment.

In step S501, the controller 7 receives original data DO from the data managing unit 5 of the host device 2A via the interface unit 6.

In step S502, the controller 7 determines material data DS and a parameter 22 used for synthesis based on meta data 19, thumb nail data 20, and base data 21 included in the original data DO, and reads the determined material data DS and parameter 22 from the secret region 9B via the memory controller 8.

In step S503, the controller 7 generates synthesized data DT based on the original data DO, the material data DS, and the parameter 22.

In step S504, the controller 7 determines whether a data size of the synthesized data DT is equal to or smaller than a data size of the original data DO.

When the data size of the synthesized data DT is equal to or smaller than the data size of the original data DO, the processing proceeds to step S506.

When the data size of the synthesized data DT is larger than the data size of the original data DO, the controller 7 converts the synthesized data DT so that the data size of the synthesized data DT is equal to or smaller than the data size of the original data DO in step S505, and the processing proceeds to step S506.

In step S506, the controller 7 writes the synthesized data DT in the public region 9A via the memory controller 8.

In the foregoing present embodiment, when the host device 2A captures an image, the memory device 1 receives the original data DO from the host device 2A. The controller 7 of the memory device 1 performs the synthesis based on the material data DS and the parameter 22 previously stored in the non-volatile memory 9 and the captured original data DO, and writes the synthesized data DT having an added value in the non-volatile memory 9. A target of the synthesis may be the thumb nail data 20, the base data 21, or both the thumb nail data 20 and the base data 21. The thumb nail data 20 may be generated from the base data 21 after the synthesis.

The controller 7 may write a portion of or the entire synthesized base data 21, a portion of or the entire synthesized thumb nail data 20, and a portion of or the entire added information about other synthesized data DT, in the wireless communication memory 12 directly or via the communication controller 11. In this case, the host device 2B can receive various data stored in the wireless communication memory 12 via the communication controller 11 and the wireless antenna 10.

In general, when the image data is synthesized in a state where the host device 2A does not recognize the image data, the file system is mismatched and the host device 2A cannot correctly recognize the synthesized data, so that there is a case where the host device 2A cannot read the synthesized data from the memory device and display the read synthetized data.

In the present embodiment, the synthesized data DT is generated so that the data size of the synthesized data DT is equal to or smaller than the data size of the original data DO and is written in the non-volatile memory 9. Accordingly, it is possible to prevent the data managing unit 5 from determining mismatch, and the synthesized data DT having an added value and drawing user's interest may be stored in the memory device 1, thereby improving convenience for the user.

An effect of the present embodiment will be described below in more detail.

A general memory card stores image data captured, for example, by a digital camera. For example, the personal computer reads image data stored in the memory card and displays the read image data. A gaming device, a print sealing machine, and the like can synthesize the captured image data with a frame, a date, a character, and the like. However, the synthesis requires a dedicated host device. When the memory device mounted in the host device performs conversion, such as synthesis or process, on the image data, there is a case where the file system of the host device does not correctly recognize the synthesized data.

In this respect, in the present embodiment, the controller 7 inside the memory device 1 performs the synthesis, but the data size of the synthesized data DT is equal to or smaller than the data size of the original data DO, so that the data managing unit 5, such as the file system, may correctly recognize the synthesized data DT. Accordingly, even when there is no dedicated host device performing the synthesis, the synthesized data DT may be easily generated by the memory device 1 mounted in the host device 2A.

In the present embodiment, even when the host device 2A does not have the synthesis function, the synthesis processing may be performed on the image data and the synthesized data DT may be stored in the memory device 1, and further, it is possible to prevent mismatching of the image original image data and the synthesized data DT by the data management in the host device 2A, thereby improving versatility of the memory device 1. By using only the memory device 1 according to the present embodiment, a user may use the conversion service of various images.

Second Embodiment

In the present embodiment, a modified example of the first embodiment will be described. In the present embodiment, a memory device, in which mismatching of data sizes does not occur in a data management by a data managing unit 5 even when both original data DO and synthesized data DT are written in a non-volatile memory 9 of the memory device, will be described.

Figure 6:
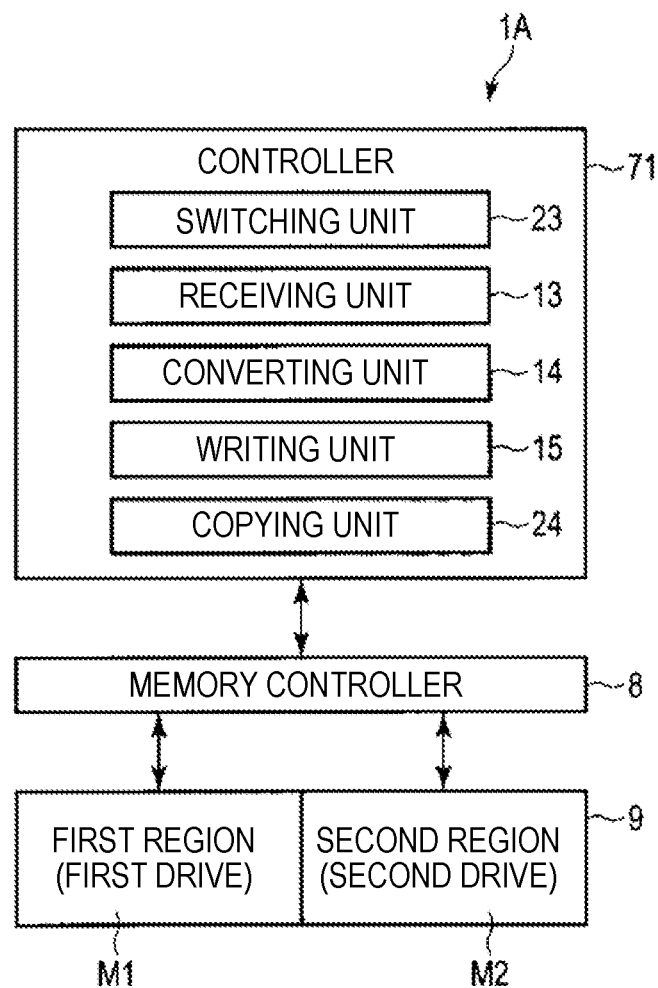
FIG. 6 is a block diagram illustrating an example of a configuration of a memory device according to a second embodiment.

FIG. 6 is a block diagram illustrating an example of a configuration of a memory device 1A according to the present embodiment.

In FIG. 6, a controller 71, a memory controller 8, and a non-volatile memory 9 among the elements of the memory device 1A are illustrated, and other elements are omitted for simplification of the description.

The controller 71 includes a switching unit 23, a receiving unit 13, a converting unit 14, a writing unit 15A, and a copying unit 24.

The non-volatile memory 9 is divided into a first region M1 and a second region M2.

The divided first region M1 and second region M2 may be the public region 9A described in the first embodiment. More particularly, the non-volatile memory 9 is divided, for example, by a partition, and the first region M1 may correspond to a first drive and the second region M2 may correspond to a second drive.

The switching unit 23 sets one of the first region M1 and the second region M2 as a primary (or main) region and the other as a secondary (or subsidiary) region and switches the primary region and the secondary region between the first region M1 and the second region M2 when electric power of the memory device 1 is supplied.

The writing unit 15A writes the synthesized data DT in the primary region and writes the original data DO and the synthesized data DT in the secondary region.

When the switching unit 23 switches the primary region and the secondary region, the copying unit 24 copies the original data DO in the primary region in the secondary region after the switching. A timing, at which the copying unit 24 copies the original data DO from the primary region to the secondary region, may be (1) a timing after the switch between the primary region and the secondary region, (2) a timing, at which the controller 71 receives a switch command from the host device 2A via the interface unit 6, or (3) a timing at which a processing load of the controller 71 is equal to or less than a predetermined threshold value.

Figure 7:
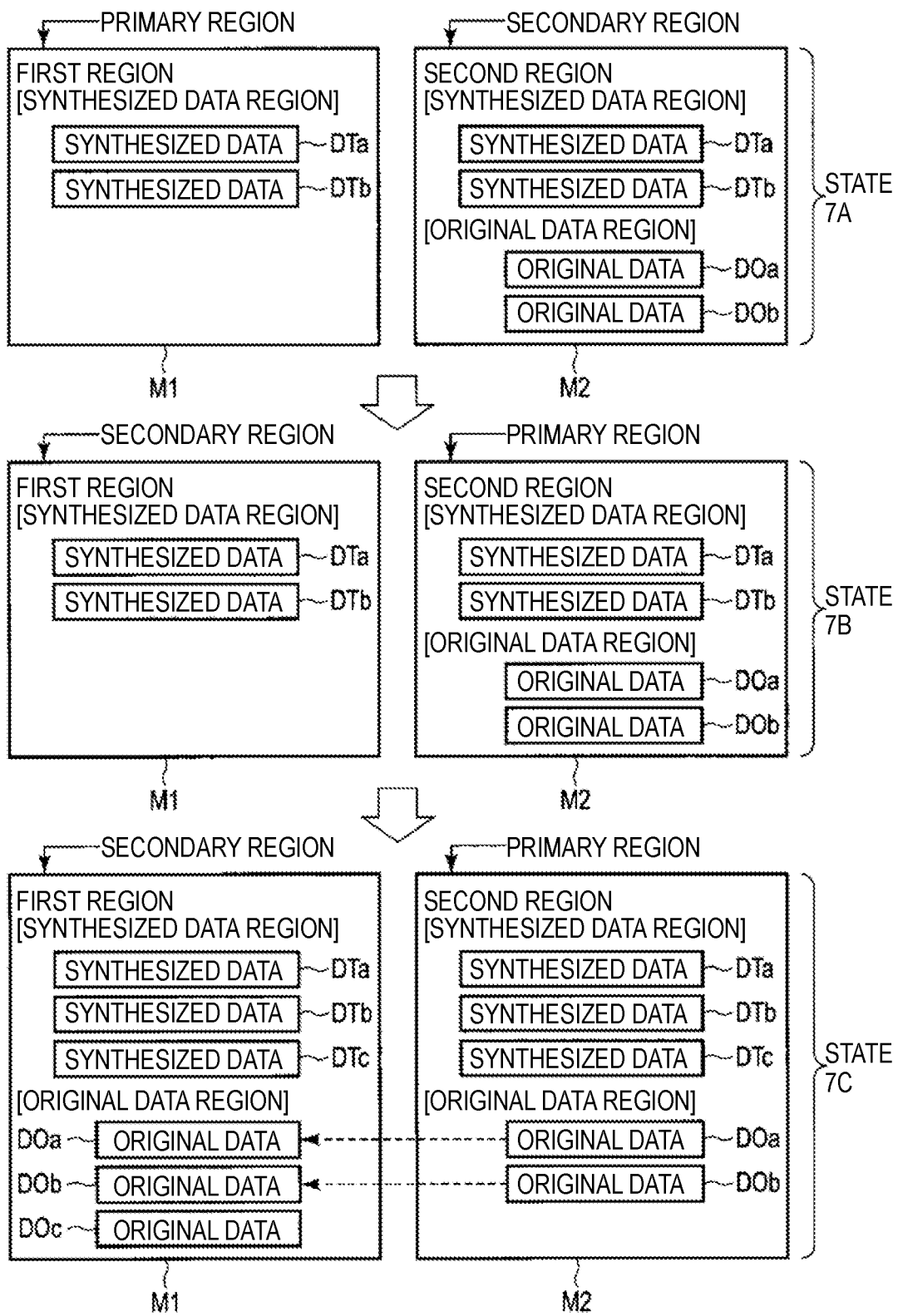
FIG. 7 is a conceptual diagram illustrating an example of a data management state in the memory device according to the second embodiment.

FIG. 7 is a conceptual diagram illustrating an example of a data management state in the memory device 1A according to the present embodiment.

The host device 2A can access the primary region in the non-volatile memory 9, but cannot access the secondary region.

In a state 7A, the first region M1 is set as the primary region and the second region M2 is set as the secondary region. In the state 7A, when the controller 71 receives original data DOa and DOb from the host device 2A via the interface unit 6, the controller 71 writes synthesized data DTa and DTb in a synthesized data region (e.g., a folder) in the first region M1 that is the primary region via the memory controller 8, writes synthesized data DTa and DTb in a synthesized data region in the second region M2 that is the secondary region via the memory controller 8, and writes original data DOa and DOb in an original data region (e.g., a folder) in the second region M2 that is the secondary region via the memory controller 8.

In the state 7A, the host device 2A can read the synthesized data DTa and DTb of the first region M1 that is the primary region via the memory controller 8, the controller 71, and the interface unit 6.

In the state 7A, the same synthesized data DTa and DTb are stored in the synthesized data region of the first region M1 that is the primary region and the synthesized data region of the second region M2 that is the secondary region, and as the storage method, the controller 71 may write the synthesized data DTa and DTb in the first region M1 by using the memory controller 8 and then copy the synthesized data DTa and DTb stored in the first region M1 in the second region M2, or the controller 71 may write the synthesized data DTa and DTb in both the first region M1 and the second region M2 by using the memory controller 8. In a state 7C to be described below, the same is applied to the case where synthesized data DTc is written in the first region M1 and the second region M2.

When a power supply of the memory device 1A is temporarily disconnected and electric power is supplied again, a state 7B is reached. In the state 7B, the first region M1 is switched to the secondary region and the second region M2 is switched to the primary region. Since the host device 2A can access the second region M2 that is the primary region, the host device 2A can access any one of the synthesized data DTa and DTb and the original data DOa and DOb.

In the state 7C, the controller 71 copies the original data DOa and DOb which are not stored in the first region M1 that is the secondary region between the original data DOa and DOb in the original data region in the second region M2 that is the primary region in the original data region in the first region M1 that is the secondary region by using the memory controller 8.

In the state 7C, when the controller 71 receives the original data DOc and the write command from the host device 2A via the interface unit 6, the controller 71 writes the synthesized data DTc in the synthesized data region in the second region M2 that is the primary region via the memory controller 8, writes the synthesized data DTc in the synthesized data region in the first region M1 that is the secondary region via the memory controller 8, and writes the original data DOc in the original data region in the first region M1 that is the secondary region via the memory controller 8.

In the state 7C, the host device 2A can read the synthesized data DTa, DTb, and DTc and the original data DOa and DOb of the second region M2 that is the primary region via the memory controller 8, the controller 71, and the interface unit 6.

Then, when the power supply is disconnected and then electric power is supplied again, the same primary region and secondary region are switched, so that the synthesized data DT is written in the primary region and the secondary region, the original data DO is written in the secondary region, and the original data DO stored before the disconnection of the power supply in the primary region and the secondary region is copied.

Figure 8:
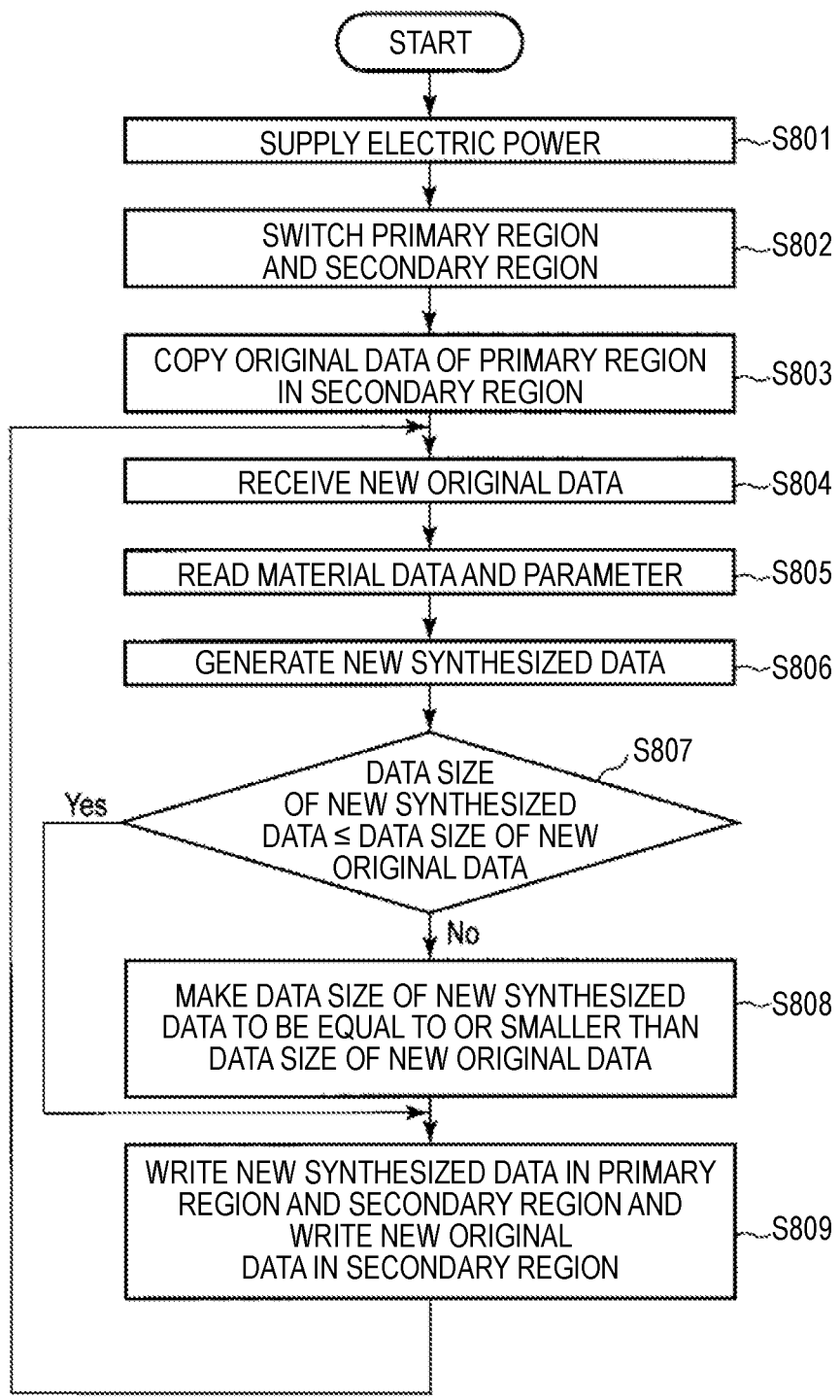
FIG. 8 is a flowchart illustrating an example of processing executed by a controller of the memory device according to the second embodiment.

FIG. 8 is a flowchart illustrating an example of processing executed by the controller 71 of the memory device 1A according to the present embodiment.

In step S801, the controller 71 detects a supply of electric power to the memory device 1A, that is, a start to supply electric power from the host device 2A to the memory device 1A.

In step S802, the controller 71 switches the primary region and the secondary region between the first region M1 and the second region M2.

In step S803, the controller 71 copies the original data, which is not stored in the secondary region, among the original data stored in the primary region in the secondary region.

In step S804, the controller 71 receives the new original data from the host device 2A via the interface unit 6.

In step S805, the controller 71 reads material data DS and a parameter 22 from a secret region 9B of the non-volatile memory 9 via the memory controller 8.

In step S806, the controller 71 generates new synthesized data based on the new original data, the material data DS, and the parameter 22.

In step S807, the controller 71 determines whether a data size of the new synthesized data is equal to or smaller than a data size of the new original data.

When the data size of the new synthesized data is equal to or smaller than the data size of the new original data, the processing proceeds to step S809.

When the data size of the new synthesized data is larger than the data size of the new original data, the controller 71 converts the new synthesized data so that the data size of the new synthesized data is equal to or smaller than the data size of the new original data in step S808, and the processing proceeds to step S809.

In step S809, the controller 71 writes the new synthesized data in the primary region and the secondary region via the memory controller 8, and writes the new original data in the secondary region via the memory controller 8.

After step 809, the processing returns to step S804.

An effect of the memory device 1A according to the foregoing present embodiment will be described.

In general, when the memory device 1A generates the synthesized data and both the synthesized data and the original data are stored in the memory device 1A, mismatching occurs in management by the data managing unit 5 of the host device 2A.

However, even when the memory device 1A generates synthesized data, the memory device 1A stores the original data, as well as the synthesized data.

As described above, a structure, in which mismatching does not occur in the management by the data managing unit 5 of the host device 2A when both the synthesized data and the original data are stored in the memory device 1A, is important.

In the present embodiment, the non-volatile memory 9 of the memory device 1A includes the first region M1 and the second region M2, and the controller 71 switches the primary region and the secondary region between the first region M1 and the second region M2 whenever electric power is supplied. The host device 2A can read the original data or the synthesized data from the primary region via the memory controller 8, the controller 71, and the interface unit 6, but may not read the original data or the synthesized data from the secondary region via the memory controller 8, the controller 71, and the interface unit 16. In the present embodiment, the controller 71 writes the original data in the secondary region via the memory controller 8. When the power supply of the memory device 1A is disconnected and electric power is supplied again, the controller 71 switches the primary region and the secondary region. As a result, the original data and the synthesized data stored in the secondary region may be switched to the primary region after the supply of the electric power, can be recognized by the data managing unit 5 of the host device 2A, and can be read, thereby preventing mismatching from occurring in the management by the data managing unit 5.

In the present embodiment, the case where the non-volatile memory 9 is divided into two regions and the primary region and the secondary region are switched between the first region M1 and the second region M2 is described, but the non-volatile memory 9 may be divided into three or more regions.

Third Embodiment

In the present embodiment, examples of the processing by the controllers 7 and 71 of the memory devices 1 and 1A according to the first and second embodiments are described in detail. Further, hereinafter, the processing for the memory device 1 is representatively described, but the same processing can be performed by the memory device 1A.

FIRST PROCESSING EXAMPLE

The controller 7 calculates RGB information from at least one of thumb nail data 20 and base data 21, determine material data DS and a parameter 22 used for synthesis based on the calculated RGB information, and determine a position of at least one of the thumb nail data 20 and the base data 21 at which material data DS is synthesized based on the calculated RGB information.

The controller 7 selects a number of pixels from at least one of the thumb nail data 20 and the base data 21, calculate characteristic information (e.g., brightness, chroma, and tone) from an arrangement of the selected pixels, determine the material data DS and the parameter 22 used for synthesis based on the calculated characteristic information, and determine a position of at least one of the thumb nail data 20 and the base data 21 at which material data DS is synthesized based on the calculated characteristic information.

The controller 7 synthesizes the material data DS, such as a character, to a position of at least one of the thumb nail data 20 and the base data 21 having high chroma.

As described above, a processing time taken for specifying a position having high chroma may be decreased by selecting a number of pixels from at least one of the thumb nail data 20 and the base data 21.

SECOND PROCESSING EXAMPLE

The host device 2B wirelessly transmits material data DS to the memory device 1. The communication controller 11 of the memory device 1 wirelessly receives the material data DS via the wireless antenna 10, and writes the material data DS in the wireless communication memory 12. The controller reads the material data DS stored in the wireless communication memory 12 via the communication controller 11, and writes the read material data DS in the secret region 9B of the non-volatile memory 9 via the memory controller 8. Accordingly, the number of elements of usable material data DS may be increased.

THIRD PROCESSING EXAMPLE

The controller 7, for example, counts the number of times of use of the material data DS for synthesis for each material data DS for the character, and write the counted value for the character in the non-volatile memory 9 via the memory controller 8 or write the counted value in the wireless communication memory 12 via the communication controller 11 and manage the material data DS. Further, the controller 7 reads the material data DS having a high version for a character of which the counted value is equal to or larger than a predetermined number from the non-volatile memory 9 via the memory controller 8. Accordingly, for example, the character used in the synthesis may be grown according to a use frequency.

FOURTH PROCESSING EXAMPLE

When the host device 2A is a gaming device, the controller 7 reads synthesized data DT synthesized for a character stored in the public region 9A of the non-volatile memory 9 via the memory controller 8, and transmits the read synthesized data DT for the character to the host device 2A via the interface unit 6. The host device 2A that is the gaming device grows the character for the synthesized data DT received from the memory device 1 and transmits material data DS for the grown character to the controller 7 via the interface unit 6. The controller 7 writes the material data DS for the grown character in the secret region 9B of the non-volatile memory 9 via the memory controller 8. Accordingly, the character used in the synthesis may be grown by the host device 2A. Further, a user may enjoy a game by making the character obtained from the memory device 1 fight in the game of the host device 2A that is the gaming device.

When the host device 2B is a gaming device, the controller 7 reads synthesized data DT synthesized for a character stored in the public region 9A of the non-volatile memory 9 via the memory controller 8, and writes the read synthesized data DT for the character in the wireless communication memory 12 via the communication controller 11. The communication controller 11 wirelessly communicates the synthesized data DT for the character stored in the wireless communication memory 12 with the host device 2A through the wireless antenna 10. The host device 2B that is the gaming device grows the character for the synthesized data DT received from the memory device 1 and wirelessly communicates material data DS for the grown character with the memory device 1. The communication controller 11 receives the material data DS for the grown character via the wireless antenna 10, and writes the material data DS for the grown character in the wireless communication memory 12. The controller 7 reads the material data DS for the grown character stored in the wireless communication memory 12 via the communication controller 11, and writes the read material data DS in the secret region 9B of the non-volatile memory 9 via the memory controller 8. Accordingly, the character used in the synthesis may be grown by the host device 2B. Further, the user may enjoy a game by making the character obtained from the memory device 1 fight in the game of the host device 2B that is the gaming device.

FIFTH PROCESSING EXAMPLE

The controller 7 reads the plurality of pieces of thumb nail data 20 of synthesized data DT from the non-volatile memory 9 via the memory controller 8, and transmits the plurality of pieces of the read thumb nail data 20 to the host device 2A via the interface unit 6. The host device 2A may generate an album of the plurality of pieces of the thumb nail data 20 and display the generated album.

Further, the controller 7 writes the plurality of pieces of the thumb nail data 20 of the synthesized data DT in the wireless communication memory 12 via the communication controller 11. The communication controller 11 wirelessly transmits the plurality of pieces of the thumb nail data 20 stored in the wireless communication memory 12 to the host device 2B via the wireless antenna 10. The host device 2B may generate an album of the plurality of pieces of the thumb nail data 20 and display the generated album.

SIXTH PROCESSING EXAMPLE

In the synthesis processing, the controller 7 may synthesize a score obtained based on the characteristic information calculated from the thumb nail data 20 or the base data 21 and material data DS for an item corresponding to the characteristic information to the thumb nail data 20 or the base data 21. Accordingly, the host device 2A or the host device 2B may combine and display the thumb nail data 20 or the base data 21, the score, and the item.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device, comprising:
a non-volatile memory; and
a controller configured to control the non-volatile memory, wherein the controller includes:
a receiving circuit configured to receive first data from an external device;
a converting circuit configured to perform synthesis on the first data received by the receiving circuit and then convert the synthesized first data to second data having a data size equal to or smaller than a data size of the first data; and
a writing circuit configured to write the second data converted by the converting circuit in the non-volatile memory.

2. The memory device according to claim 1, wherein the first data is image data managed by a file system driver of the external device, and includes meta data, thumb nail data, and base data, and
the converting circuit changes first length information of the thumb nail data, second length information of a frame including the thumb nail data within the meta data, and a storage start position of the base data, the first and second length information and the storage start position being described by the meta data.

3. The memory device according to claim 1, wherein the non-volatile memory includes a first region and a second region,
the controller further includes a switching circuit which sets one of the first region and the second region as a main region and the other as a subsidiary region, and switches the main region and the subsidiary region between the first region and the second region when electric power is supplied,
the writing circuit is configured to write the second data in the main region and the first data and the second data in the subsidiary region, and
the controller additionally includes a copying circuit configured to copy the first data of the main region into the subsidiary region after the switching circuit switches the main region and the subsidiary region.

4. The memory device according to claim 1, wherein
the non-volatile memory includes a public region and a secret region which stores material data used by the converting circuit, and
the converting circuit generates the second data by synthesizing the first data received by the receiving circuit and the material data read from the secret region, and the writing circuit writes the second data in the public region.

5. The memory device according to claim 4, further comprising:
a wireless antenna;
a memory which is operable based on electric power supplied from the wireless antenna; and
a communication controller which is operable based on the electric power supplied form the wireless antenna, and configured to perform communication by using the wireless antenna,
wherein when the material data is received from a wireless communication device via the wireless antenna and the communication controller, the controller writes the material data in the secret region.

6. The memory device according to claim 5, wherein the material data includes image data related to a toy item and a toy character.

7. A gaming apparatus including a host device and a memory device including a non-volatile memory and a controller configured to control the non-volatile memory, wherein the controller includes:
a receiving circuit configured to receive first data from the host device;
a converting circuit configured to perform synthesis on the first data received by the receiving circuit and then convert the synthesized first data to second data having a data size equal to or smaller than a data size of the first data; and
a writing circuit configured to write the second data converted by the converting circuit in the non-volatile memory.

8. The gaming apparatus according to claim 7, wherein
the first data is image data managed by a file system driver of the host device, and includes meta data, thumb nail data, and base data, and
the converting circuit changes first length information of the thumb nail data, second length information of a frame including the thumb nail data within the meta data, and a storage start position of the base data, the first and second length information and the storage start position being described by the meta data.

9. The gaming apparatus according to claim 7, wherein the non-volatile memory includes a first region and a second region,
the controller further includes a switching circuit which sets one of the first region and the second region as a main region and the other as a subsidiary region, and switches the main region and the subsidiary region between the first region and the second region when electric power is supplied,
the writing circuit is configured to write the second data in the main region and the first data and the second data in the subsidiary region, and
the controller additionally includes a copying circuit configured to copy the first data of the main region into the subsidiary region after the switching circuit switches the main region and the subsidiary region.

10. The gaming apparatus according to claim 7, wherein
the non-volatile memory includes a public region and a secret region which stores material data used by the converting circuit, and
the converting circuit generates the second data by synthesizing the first data received by the receiving circuit and the material data read from the secret region, and the writing circuit writes the second data in the public region.

11. The gaming apparatus according to claim 10, wherein the memory device further comprises:
a wireless antenna;
a memory which is operable based on electric power supplied from the wireless antenna; and
a communication controller which is operable based on the electric power supplied form the wireless antenna, and configured to perform communication by using the wireless antenna,
wherein when the material data is received from a wireless communication device via the wireless antenna and the communication controller, the controller writes the material data in the secret region.

12. The gaming apparatus according to claim 11, wherein the material data includes image data related to a toy item and a toy character.

13. A method of managing data stored in a memory device that is connected to a host device, the method comprising:
receiving first data from the host device;
performing synthesis on the received first data and then converting the synthesized first data to second data having a data size that is equal to or smaller than a data size of the first data; and
writing the second data in a non-volatile memory of the memory device.

14. The method according to claim 13, wherein
the first data is image data managed by a file system driver of the host device, and includes meta data, thumb nail data, and base data, and
during the converting, first length information of the thumb nail data, second length information of a frame including the thumb nail data within the meta data, and a storage start position of the base data, which are described by the meta data, are changed.

15. The method according to claim 13, wherein the non-volatile memory includes a first region and a second region, said method further comprising:
setting one of the first region and the second region as a main region and the other as a subsidiary region; and
switching the main region and the subsidiary region between the first region and the second region when electric power is supplied, wherein
the second data is written into the main region and the first data and the second data are written into the subsidiary region.

16. The method according to claim 15, further comprising:
copying the first data of the main region into the subsidiary region after switching the main region and the subsidiary region.

17. The method according to claim 13, wherein
the non-volatile memory includes a public region that stores the second data and a secret region which stores material data, and
during the converting, the second data is generated by synthesizing the first data and the material data read from the secret region.

18. The method according to claim 17, wherein the material data includes image data related to a toy item and a toy character.

\* \* \* \* \*